United States Patent [19]
Portuesi

[11] 3,747,845
[45] July 24, 1973

[54] SPEED AND DISTANCE COMPUTER FOR BICYCLES

[75] Inventor: Salvador F. Portuesi, Taylor, Mich. 48180

[73] Assignee: Eugene G. Portuesi, Cadillac, Mich.; a part interest

[22] Filed: June 23, 1972

[21] Appl. No.: 265,700

[52] U.S. Cl. .................. 235/78, 235/84, 235/88
[51] Int. Cl. .................. G06c 27/00, G06c 3/00
[58] Field of Search .................. 235/78, 88, 84, 116

[56] References Cited
UNITED STATES PATENTS

| | | | |
|---|---|---|---|
| 809,294 | 1/1906 | Fry | 235/88 |
| 1,476,489 | 12/1923 | Carver | 235/88 |
| 2,331,967 | 10/1943 | Ernst et al. | 235/84 |
| 2,809,787 | 10/1957 | Bartow | 235/84 |

Primary Examiner—Stephen J. Tomsky
Attorney—Irving M Weiner, Andrew R. Basile et al.

[57] ABSTRACT

A computer for calculating the speed and distance traveled by a bicycle. The computer comprises a circular base plate having an angularly spaced integers forming concentric scales representative of the bicycle speed, gear ratio, number of sprocket teeth and the distance traversed by the bicycle per crank revolution. A circular member pivotally carried by the circular base plate has angularly spaced integers forming concentric scales representative of the number of teeth in the bicycle chain wheel, the crank revolutions per minute, the time enroute and selected bicycle wheel diameters. The circular member has a plurality of arcuate transparent portions overlying portions of the scales located on the base plate with portions of the circular members' scales extending along side the arcuate portions and adapted to register with the base plate scales to provide the desired calculations.

10 Claims, 4 Drawing Figures

SPEED AND DISTANCE COMPUTER FOR BICYCLES

BACKGROUND OF THE INVENTION

1. Field of the Invention

The present invention relates to mechanical computers and, in particular, to a circular computer for calculating time, speed, and distance parameters of varying sized bicycles.

2. Description of the Prior Art

Although circular computers of the type disclosed herein have been employed in calculating speed, time and distance, such as the computers illustrated in U. S. Pat. Nos. 1,476,489; 2,331,967; 3,282,501; 3,473,731; and 3,635,397, no computer, to the knowledge of the inventor, exist for calculating the time, distance and speed parameters of a bicycle.

SUMMARY OF THE INVENTION

The present invention which will be described in greater detail hereinafter comprises a computer for calculating the speed, time enroute and distance travelled by bicycles having different wheel diameters.

It is therefore an object of the present invention to provide a new and improved computer which is simple in its operation and construction, compact in size and inexpensive to manufacture.

Other objects advantages, and applications of the present invention will become apparent to those skilled in the art of computers when the accompanying description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like components and characters throughout the several views, and in which.

DESCRIPTION OF THE PREFERRED EMBODIMENT

Figure 1:
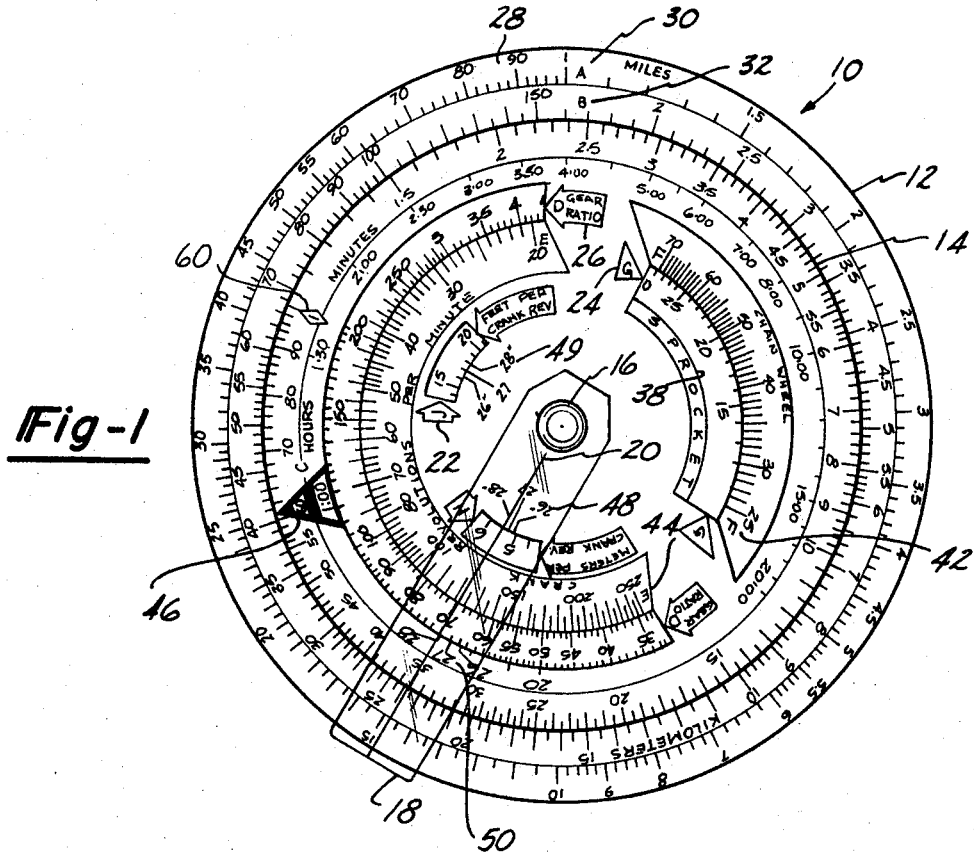
FIG. 1 is a plan elevational view of a computer incorporating the principles of the present invention and illustrating one operative mode thereof for performing a particular calculation.
Figure 2:
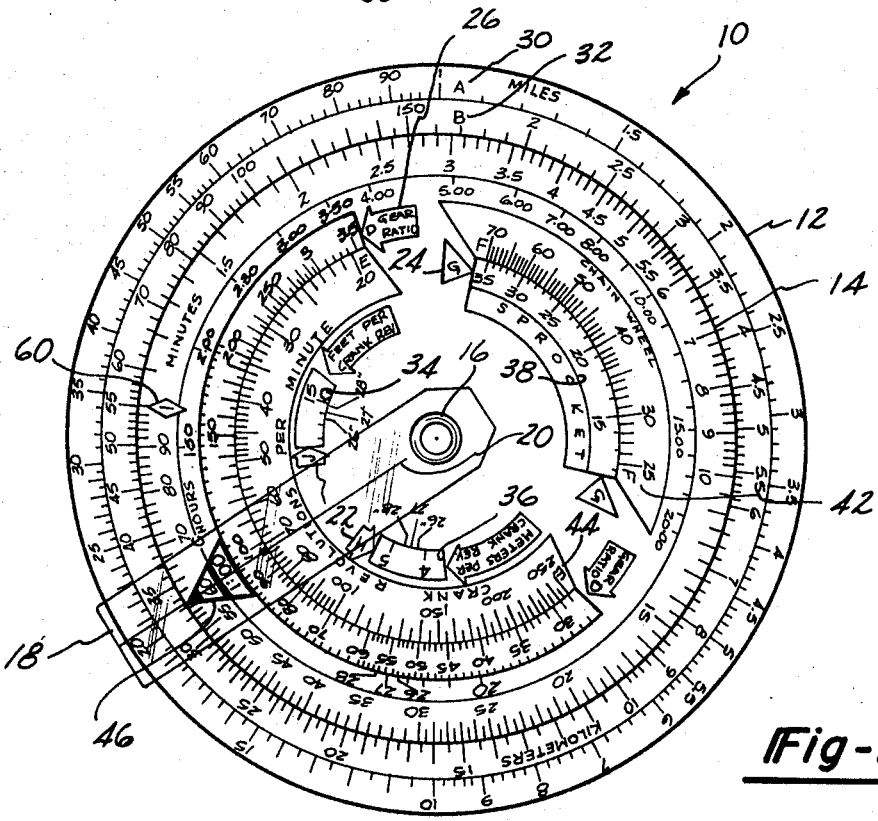
FIG. 2 is a plan elevational view of the computer illustrated in FIG. 1 showing a second operative mode thereof for performing a second calculation.

Referring now to the drawings and in particular to FIGS. 1 and 2 wherein there is illustrated one example of the present invention in the form of a bicycle computer 10 of the circular slide type comprising a baseplate 12 and a circular top member 14 overlying the baseplate 12 and pivotally secured at its center to the baseplate 12 by any suitable means such as pin 16. The pin 16 further pivotally support a transparent pointer 18 having a hairline 20. The circular top member 14 is pivoted about the face of the baseplate 12 permitting the registration of certain indicia carried by the baseplate 12 and the top member 14 in order to perform selected calculations and determine the speed, time enroute, gear ratio and distance travelled by a bicycle, all of which will be explained in greater detail hereinafter.

Figure 3:
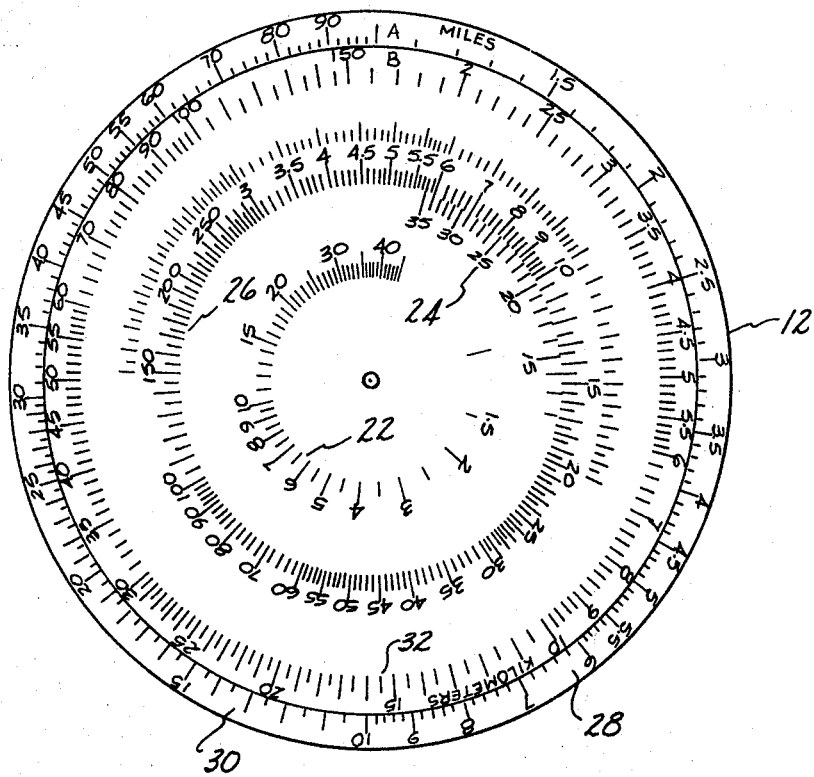
FIG. 3 is a plan elevational view of a circular baseplate forming a part of the computer illustrated in FIG. 1.
Figure 4:
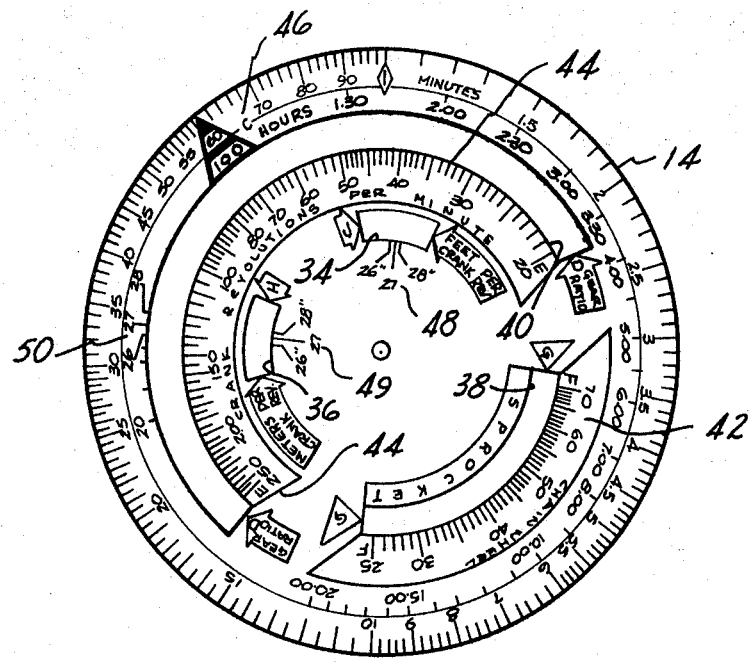
FIG. 4 is a plan elevational view of a circular member forming a part of the computer illustrated in FIG. 1.

Referring now to FIG. 3 wherein the baseplate 12 is illustrated as having a circular or disc shape and is preferably fabricated from a transparent plastic material with the indicia described hereinafter printed on the upper surface while the back side thereof may have printed thereon suitable operating information (not shown) to enable the user to easily operate the computer 10. The baseplate 12 has a plurality of concentrically disposed scales arranged in a fixed position with respect to one another and having angularly spaced integers logarithmically arranged and representative of speed, time and distance and other parameters as will be explained hereinafter. The inner most scale is a distance per crank revolution scale 22 (H and J scales) which is adapted to provide the distance in either meters or feet traversed by bicycles having different diameter wheels as a function of the revolutions of the bicycle crank. The next outwardly spaced group of integers represents a sprocket scale 24 (G scale) wherein the integers thereon represent the number of teeth in the wheel sprocket of a bicycle.

The next radially outwardly positional scale is the gear ratio scale 26 (D scale) having integers which represent the gear ratio of a bicycle as a function of the number of teeth in the wheel sprocket, and the chainwheel as well as the diameter of the bicycle wheel. It should be noted that a portion of the gear ratio scale 26 extends along side of the sprocket scale 24.

A speed scale 28 is printed adjacent the outer edge of the baseplate 12 and comprises two sub-scales, a miles per hour scale 30 (A scale) and a kilometers per hour scale 32 (B scale).

The circular top member 14 is preferably fabricated from a transparent plastic material the back side, that is, the baseplate facing side, of which has a plurality of concentrically disposed scales printed thereon such that the scales are readable through the top face of the top member 14. The back side of the top member 14 is then imprinted with a non-transparent coloring which is so arranged as to not imprint on four arcuate portions of the top member 14 forming window or transparent portions 34, 36 and 40. The transparent portions 34 and 36 are radially displaced from the center of the member 14 such that the transparent portions 34 and 36 will exposed a part of the distance per crank revolution scale 22 (H and J scales) when the top member is pivotally secured to the baseplate by pin 16 while the arcuate transparent portions 38 and 40 are radially spaced from the center of the top member 14 so as to respectively expose portions of the sprocket scale 24 and the gear ratio scale 26.

The top member 14 has a chainwheel scale 42 (F scale) with integers which are representative of the number of teeth in the chainwheel of a bicycle. A crank revolutions scale (E scale) 44 has integers which are representative of the number of revolutions made by the bicycle crank per minute. The crank revolutions scale 44 and the chainwheel scale 42 respectively extend along side the transparent arcuate portions 40 and 38 and are adapted to register respectively with the integers on the gear ratio scale 26 and the sprocket scale 24 as well be explained.

A time scale 46 (C scale) is provided at the outer most edge of the top member 14 and has integers which are representative of the time enroute in minute and hours.

Extending along side of the transparent arcuate portions 34, 36 and 40 respectively exposing the scales 22 and 26 printed on the baseplate 12, there is provided wheel diameter scales 48, 49 and 50, each of which has integers representative of the diameter of a bicycle wheel, eg. 26 inches, 27 inches, and 28 inches. The scales printed on the top member 14 are arranged in a fixed psotion with respect to one another having angularly spaced integers which a logarithmically arranged and are representative of parameters as aforementioned.

Referring now to FIG. 1 for one example of the operation of the computer 10 for calculating the gear ratio of a bicyle having for purposes of illustration a chainwheel with 50 teeth, a sprocket with 20 teeth and a wheel diameter of 28 inches. In order to calculate the gear ratio, the number of teeth on the sprocket scale 24 (G) is set under the number of teeth on the chainwheel scale (F). Using the hairline 20 on the pointer 18 and aligning the same on the numeral 28 on the wheel diameter scale 50 the gear ratio can be read off the gear ratio scale 26 (D) as being approximately 70. At the same time using the wheel diameter scales 48 and 49 the number of feet and/or meters traversed by the bicycle per crank revolution can be respectively read on the J and H scales respectively through the transparent portions 49 and 48.

Referring now to FIG. 2 for a second example of the operation of the computer 10 for calculating the speed of the bicycle having the same parameters as aforementioned and a crank speed of 100 revolutions per minute. The gear ratio of 70 on the scale 26 (D) is positioned over the number 100 on the crank revolution scale 44 and at the 60 minute mark on the time scale 46 (C) the miles per hour or the kilometers per hour can be respectively read on the scales 30 (A) or 32 (B).

In addition to the aforementioned examples, the present inventive computer 10 may be used to calculate the bicycle speed at any given crank RPM or over a given distance; the average crank RPM over a given distance; the time enroute and a conversion of mile to kilometers and vice versa.

For example, the bicycle speed at a given crank RPM can be calculated by setting the gear ratio scale 26 (D) over the crank RPM scale 44 (E) and at the 60 minute mark on the time scale 46 (C) reading either MPH or KPH respectively on scales 30 (A) and 32 (B).

The average crank RPM over a given distance can be calculated by setting the elapsed time on the time scale 46 (C) under the distance covered on either scales 30 (A) or 32 (B) while under the gear ratio scale 26 (D) the average crank RPM can be read on scale 44 (E).

The bicycle speed over a given distance can be calculated by setting the distance covered on either scales 30 (A) or 32 (B) over the elapsed time or scale 46 (C) while at the 60 minute mark on the time scale 46 (C) the speed on either MPH or KPH can be respectively read on scales 30 (A) and 32 (B).

The time enroute of the bicycle can be calculated by setting the 60 minute mark on the time scale 46 (C) under the estimated MPH or KPH on scales 30 (A) or 32 (B) while under the distance to be covered (scales 30 (A) or 32 (B) the estimated time enroute can be read on the time scale 46 C).

Miles can be converted to kilometers by locating the miles on scale 30 (A) and reading the kilometers on scale 32 (B) directly therebelow while kilometers can be converted to locating the kilometers on scale 32 (B) and reading the miles on scale 30 (A) directly thereabove.

It should be noted the computer 10 may be used as a logarithemic circular slide rule by using the starting point 1 within the diamond on scale C as the numeral 1 in conjunction with the scale B in the same manner as any other conventional circular slide rule is utilized.

Although only one example of the present invention has been disclosed, it is to be understood by those skilled in the art of computers that other forms of the invention may be had all coming within the spirit of the invention and scope of the appended claims.

What is claimed is as follows:

1. A bicycle speed and distance computer comprising:

a circular baseplate;

a gear ratio scale including successively angularly spaced integers, each representative of the gear ratio of a bicycle chain drive and disposed on one face of said circular baseplate;

a sprocket scale including successively angularly space integers, each representative of the number of teeth on a bicycle sprocket and disposed in a predetermined fixed location on said one face of said baseplate with respect to said gear ratio scale and extending alongside a portion of said gear ratio scale;

a circular member pivotally secured to said baseplate and overlying same, said circular member having first and second transparent arcuate portions respectively overlying and exposing a portion of the integers on said sprocket scale and said gear ratio scale as said circular member is pivoted with respect to said baseplate;

a chainwheel scale including successively angularly spaced integers, each representative of the number of teeth on a bicycle chainwheel and disposed in a predetermined fixed location on the exposed face of said circular member and extending alongside a portion of said first arcuate portions;

a wheel diameter scale including successively angularly spaced integers, each representative of the diameter of a bicycle wheel and disposed in a predetermined fixed location on said exposed face of said circular member with respect to said chainwheel scale and extending alongside side a portion of said second arcuate portion.

2. The bicycle speed and distance computer defined in claim 1, further comprising a distance per crank revolution scale including successively angularly spaced integers, each representative of the distance traversed per revolution of the bicycle crank, said last mentioned scale disposed on said one face of said circular baseplate in a predetermined fixed location with respect to said sprocket scale, said circular member having third and fourth transparent, angularly spaced arcuate protions overlying and exposing angularly spaced portions of said distance per crank revolution; a second and third wheel diameter scales each including successively angularly spaced integers, each representative of the diameter of a bicycle wheel and disposed in a predetermined fixed location on said exposed face of said circular member with respect to said chainwheel scale and respectively extending alongside said third and fourth arcuate portions, one of said last mentioned wheel diameter scales registering with said distance per crank revolution scale to indicate the distance traversed in meters per crank revolution, the other of said wheel diameter scales registering with said distance per crank revolution to indicate the distance traversed in feet per crank revolution.

3. The bicycle speed and distance computer defined in claim 1 further comprising:
   a crank revolutions scale including successively angularly spaced integers, each representative of the crank revolutions per minute said last mentioned scale disposed on said exposed face of said circular member in a predetermined location with respect to said chainwheel scale and extending along side a portion of said second arcuate portion;
   a speed scale including successively angularly spaced integers, each representative of the speed of the bicycle, said speed scale disposed on said baseplate in a predetermined location with respect to said gear ratio scale and means located on said circular member for registering with said speed scale to indicate the speed of said bicycle at any given crank speed.

4. The bicycle speed and distance computer defined in claim 3 further comprising a time scale including successively angularly spaced integers, each representative of an increment of time, said time scale being disposed on said circular member in a predetermined location with respect to said crank revolution scale, said last mentioned means being the 60 minute increment on said time scale.

5. The bicycle speed and distance computer defined in claim 4 wherein said time scale is logarithmically arranged.

6. The bicycle speed and distance computer defined in claim 3 wherein said speed scale is arranged in kilometers per hour.

7. The bicycle speed and distance computer defined in claim 3 wherein said speed scale is arranged in miles per hour.

8. The bicycle speed and distance computer defined in claim 2 further comprising:
   a crank revolutions scale including successively angularly spaced integers, each representative of the crank revolutions per minute said last mentioned scale disposed on said exposed face of said circular member in a predetermined location with respect to said chainwheel scale and extending alongside a portion of said second arcuate portion;
   a speed scale including successively angularly spaced integers, each representative of the speed of the bicycle, said speed scale disposed on said baseplate in a predetermined location with respect to said gear ratio scale and means located on said circular member for registering with said speed scale to indicate the speed of said bicycle at any given crank speed.

9. The bicycle speed and distance computer defined in claim 8, further comprising:
   a time scale including successively angularly spaced integers, each representative of an increment of time, said time scale being disposed on said circular member in a predetermined location with respect to said crank revolution scale, said last mentioned means being the 60 minute increment on said time scale.

10. The bicycle speed and distance computer defined in claim 9 wherein said time scale is logarithmically arranged.

* * * * *